(12) United States Patent
Spilker

(10) Patent No.: US 9,917,284 B2
(45) Date of Patent: Mar. 13, 2018

(54) SYSTEM AND METHOD FOR A NON-HAZMAT SHIPPABLE PORTABLE POWER DEVICE

(71) Applicant: Virideon, Inc, St. Petersburg, FL (US)

(72) Inventor: David Keith Spilker, Melbourne, FL (US)

( * ) Notice: Subject to any disclaimer, the term of this patent is extended or adjusted under 35 U.S.C. 154(b) by 290 days.

(21) Appl. No.: 14/615,028

(22) Filed: Feb. 5, 2015

(65) Prior Publication Data

US 2015/0228937 A1    Aug. 13, 2015

Related U.S. Application Data

(60) Provisional application No. 61/937,442, filed on Feb. 7, 2014.

(51) Int. Cl.
| | |
|---|---|
| *H01M 2/20* | (2006.01) |
| *H01M 10/052* | (2010.01) |
| *H01M 10/42* | (2006.01) |
| *H01M 2/10* | (2006.01) |

(52) U.S. Cl.
CPC .......... *H01M 2/1022* (2013.01); *H01M 2/204* (2013.01); *H01M 10/052* (2013.01); *H01M 10/425* (2013.01)

(58) Field of Classification Search
CPC .................................................. H01M 2/1022
See application file for complete search history.

(56) References Cited

U.S. PATENT DOCUMENTS

| | | |
|---|---|---|
| 1,280,657 A | 10/1918 | Burgess |
| 2,779,527 A | 1/1957 | Fallert |
| 5,160,025 A | 11/1992 | Greenwald |
| (Continued) | | |

FOREIGN PATENT DOCUMENTS

DE    102012001390 A1 *  8/2013  ............ H01M 2/202

OTHER PUBLICATIONS

Translation of DE102012001390A1.*

*Primary Examiner* — Sarah A. Slifka
*Assistant Examiner* — Brian R Ohara
(74) *Attorney, Agent, or Firm* — Daniel W. Roberts; Law Offices of Daniel W. Roberts, LLC

(57) ABSTRACT

Provided are a system and method for a non-hazmat shippable portable power device ("NHSPD"). The NHSPD includes at least one cell block providing a plurality of electrically isolated encased electrochemical cells each in a predetermined location, each cell having one positive and one negative terminal in a predetermined location. At least one backplane circuit board is disposed adjacent to each cell block and, for each positive and negative terminal of each cell, the adjacent circuit board provides electrically isolated traces from each cell to at least one grouping area, the grouping area providing a connection point for each trace. A physically separate interconnection cap having at least one external positive terminal and external negative terminal connected by electrical circuitry to at least one connector structured and arranged to physically connect with each connection point of each trace at such time as the interconnection cap is disposed adjacent to the at least one cell block such that the cap connector engages the trace connection points. A method of providing NHSPD is also disclosed.

37 Claims, 10 Drawing Sheets

(56) References Cited

U.S. PATENT DOCUMENTS

| | | | |
|---|---|---|---|
| 6,048,637 A * | 4/2000 | Tsukahara | H01M 10/0567 429/188 |
| 6,242,129 B1 * | 6/2001 | Johnson | H01M 4/366 429/162 |
| 7,486,047 B2 | 2/2009 | Phillips et al. | |
| 7,573,233 B1 * | 8/2009 | Chow | H02J 7/0026 320/116 |
| 2002/0086647 A1 * | 7/2002 | Ilvonen | H01M 2/1066 455/90.3 |
| 2003/0059676 A1 * | 3/2003 | Ruiz Rodriguez | H01M 2/0242 429/164 |
| 2011/0210703 A1 * | 9/2011 | Souza | H02J 7/0019 320/136 |
| 2012/0156537 A1 * | 6/2012 | Meintschel | B60L 11/1874 429/99 |

* cited by examiner

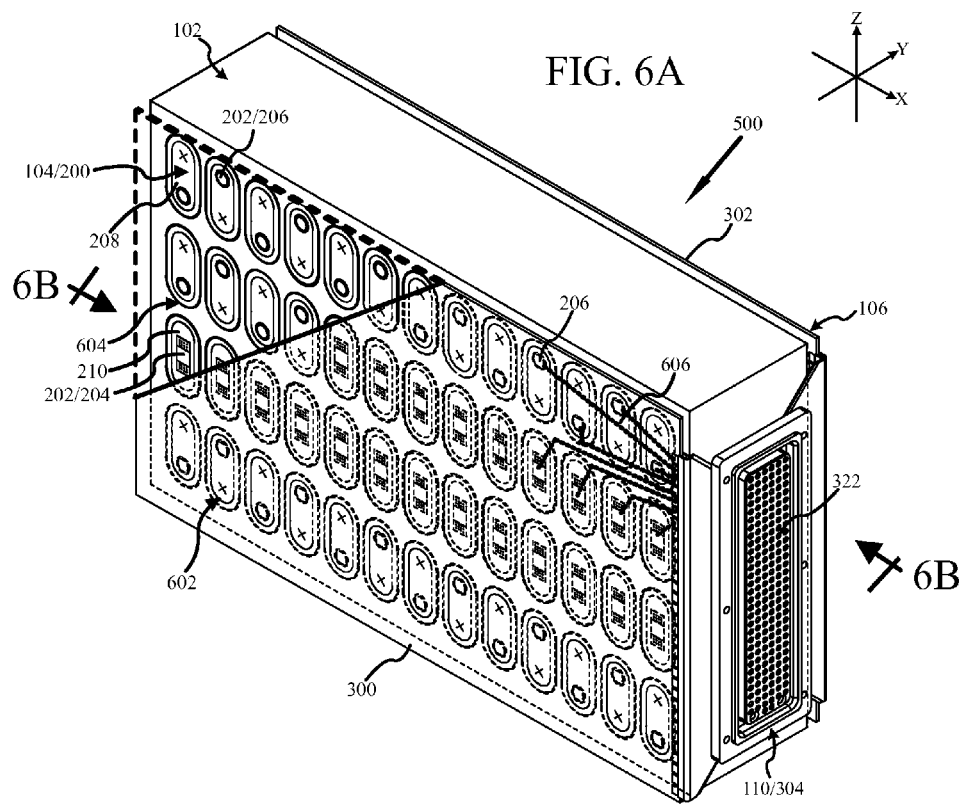
FIG. 6A
FIG. 6B
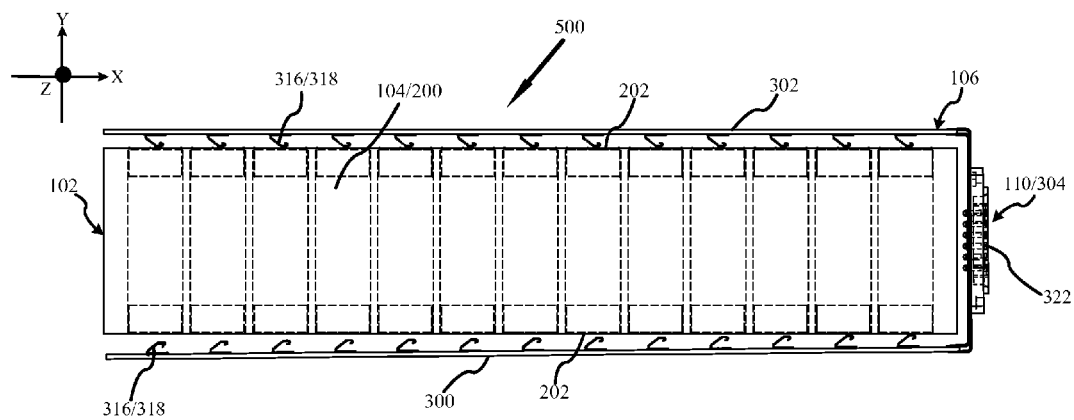

SYSTEM AND METHOD FOR A NON-HAZMAT SHIPPABLE PORTABLE POWER DEVICE

CROSS REFERENCE TO RELATED APPLICATIONS

This application claims the benefit under 35 U.S.C. § 119(e) of U.S. Provisional Application No. 61/937,442 filed on Feb. 7, 2014 and entitled System And Method For A Non-Hazmat Shippable Portable Power Device, the disclosure of which is incorporated herein by reference.

FIELD OF THE INVENTION

The present invention relates generally to portable power supply devices, and more specifically to a configuration of such power devices characterized by a passive initial state of the device making it generally safe for transport by aircraft without classification as hazardous materials, and a functional state wherein the power providing cells are interconnected after shipment so as to provide the desired power supply which would have otherwise been potentially classified as hazardous material if shipped in the functional state.

BACKGROUND

Portable power supply devices, such as batteries are widely used as power sources in portable electrical and electronic products. Recently, Lithium Batteries have become attractive devices for providing portable power due their generally high power to weight ratio, and in the case of rechargeable configurations, their durability in maintaining high functionality after repeated charge and discharge.

Lithium batteries as a term typically refers to a family of batteries with different chemistries, comprising may types of cathode and electrolytes, but for general purposes they can be separated into two categories. Lithium metal batteries are generally non-rechargeable and have lithium metal or lithium compounds as an anode. As lithium metal batteries are not rechargeable they are also referred to as primary batteries. Lithium metal batteries are typically used to power devices such as watches, camera, calculators, scales, sensors, and the like.

Lithium-ion batteries which may also be identified as Li-ion batteries, are a type of rechargeable battery. As they are rechargeable they are also referred to as secondary batteries. Li-ion batteries are typically used to power mobile telephones, smart phones, laptops, medical devices, industrial equipment, automobiles and the like.

There is a specific difference between a battery and a cell as indicated by the UN Manual of Tests and Criteria. Specifically, a "battery" is understood to be two or more cells which are electrically connected together and fitted with devices necessary for use, such as a case, terminals, labels, protective devices, and the like. A "cell" is a single encased electrochemical unit having one positive and one negative electrode which exhibits a voltage differential across its two terminals. Many items called lithium batteries that are in fact a single cell, are in fact considered a cell for testing and transportation purposes.

While the rate of failures associated with the use of lithium based batteries is small especially in comparison to the large number of Li-ion batteries in use worldwide, several incidents have been well publicized and have raised awareness that lithium batteries, understood as devices comprising multiple interconnected cells, can develop issues. In particular, Li-Ion batteries when in use or when shorted accidently may develop significant heat, which can lead to explosion and or fire.

Although many forms of transpiration exist—car, truck, train, boat, or the like—aircraft transportation has become very common Though rare, problematic Li-ion batteries generating heat leading to fire and or explosion are highly undesirable conditions to experience while in flight. As such there has been a growing desire to establish rules and regulations for the transpiration of electrochemical power devices such as lithium based batteries. These rules and regulations generally pertain to additional testing measure for the batteries themselves, increased housing and shipping structures and of course overall cost for both the certification and shipping measures.

Specifically, the International Air Transport Association has issued a specific guideline for lithium battery transport based on the findings of the ICAO Dangerous Goods Panel (DGP) in 2012 which may be summarized to state that lithium batteries over 100 watt hours or lithium cells over 20 watt hours are now to be declared Class 9 Hazardous Goods when shipping. As a consequence, lithium batteries over 100 watt hours or lithium cells over 20 watt hours require special training and licenses to ship. They also require UN/DOT 38.3 testing prior to shipping and certification. Moreover, despite a growing need for portable lithium batteries with over 100 watt hours or lithium cells each with over 20 watt hours, the costs and the time associated with transporting such portable power devices, especially by air, are substantially increasing.

Although one or more individual cells are not considered to present the same potential problems and issues, individual cells are inconvenient. Portable high power communication systems, computers, medical devices, and most other high power portable systems are designed with the expectation that a battery composed of multiple cells will be available for use in the desired location. In many instances, these multiple cell batteries can be quite large which places the desire for portable power by way of a lithium based battery at odds with the new and developing rules and regulations for commercial transportation of the battery systems.

Hence there is a need for a method and system that is capable of overcoming one or more of the above identified challenges.

SUMMARY

Our invention solves the problems of the prior art by providing novel systems and methods for a non-hazmat shippable portable power device.

In particular, and by way of example only, according to one embodiment of the present invention, provided is a non-hazmat shippable portable power device, including: a cell block providing a plurality of electrically isolated encased electrochemical cells, each having one positive and one negative terminal, the cell block including a plurality of conductors paired to group the positive and negative terminals of each cell within the cell block in at least one common location without interconnection between the conductors; and a physically separate interconnection cap having at least one external positive terminal and at least one external negative terminal electrically connected to a receiver section structured and arranged to receive and make physical electrical contact with each of the paired conductors of the cell block to provide a battery by interconnecting the conductors from each cell at such time as the receiver section is coupled to the grouped conductors of the cell block.

In yet another embodiment, provided is a non-hazmat shippable portable power device, including: at least one cell block providing a plurality of electrically isolated encased electrochemical cells each in a predetermined location, each cell having one positive and one negative terminal in a predetermined location; at least one backplane circuit board disposed adjacent to each cell block and, for each positive and negative terminal of each cell, the adjacent circuit board providing electrically isolated traces from each cell to at least one grouping area, the grouping area providing a connection point for each trace; and a physically separate interconnection cap having at least one external positive terminal and external negative terminal connected by electrical circuitry to at least one connector structured and arranged to physically connect with each connection point of each trace at such time as the interconnection cap is disposed adjacent to the at least one cell block such that the cap connector engages the trace connection points.

Still, in yet another embodiment, provided is a non-hazmat shippable kit for a portable power device, including: at least one cell block providing a plurality of electrically isolated encased electrochemical cells each in a predetermined location, each cell having one positive and one negative terminal in a predetermined location; at least one backplane circuit board to be disposed adjacent to each cell block and for each positive and negative terminal of each cell providing electrically isolated traces from each cell to at least one grouping area, the grouping area providing a connection point for each trace; a housing having a chamber structured and arranged to receive the cell block and disposed backplane circuit board; a non-conductive spacer structured and arranged to fit around the connection point of the backplane circuit board when the backplane circuit board and cell block are disposed within the housing; a physically separate interconnection cap having at least one external positive terminal and external negative terminal connected by electrical circuitry to at least one connector structured and arranged to electrically connect with each connection point of each trace at such time as the interconnection cap is disposed adjacent to the at least one cell block such that the cap connector engages the trace connection points; and an attacher structured and arranged to attach the physically separate interconnection cap to housing and align the interconnector cap connector to electrically couple to the grouped connection points of each trace to provide a battery with a protective housing.

BRIEF DESCRIPTION OF THE DRAWINGS

At least one method and system for providing a non-hazmat shippable portable power device will be described, by way of example in the detailed description below with particular reference to the accompanying drawings in which like numerals refer to like elements, and:

FIGS. 6A and 6B are partial cut away illustrations depicting the backplane circuit board disposed about a cell block as shown in FIG. 4, for a non-hazmat shippable portable power device in accordance with at least one embodiment of the present invention;

DETAILED DESCRIPTION

Before proceeding with the detailed description, it is to be appreciated that the present teaching is by way of example only, not by limitation. The concepts herein are not limited to use or application with a specific system or method for determining semantics and the probable meaning and/or context of words. Thus although the instrumentalities described herein are for the convenience of explanation shown and described with respect to exemplary embodiments, it will be understood and appreciated that the principles herein may be applied equally in other types of systems and methods involving non-hazmat shippable portable power devices.

Figure 1:
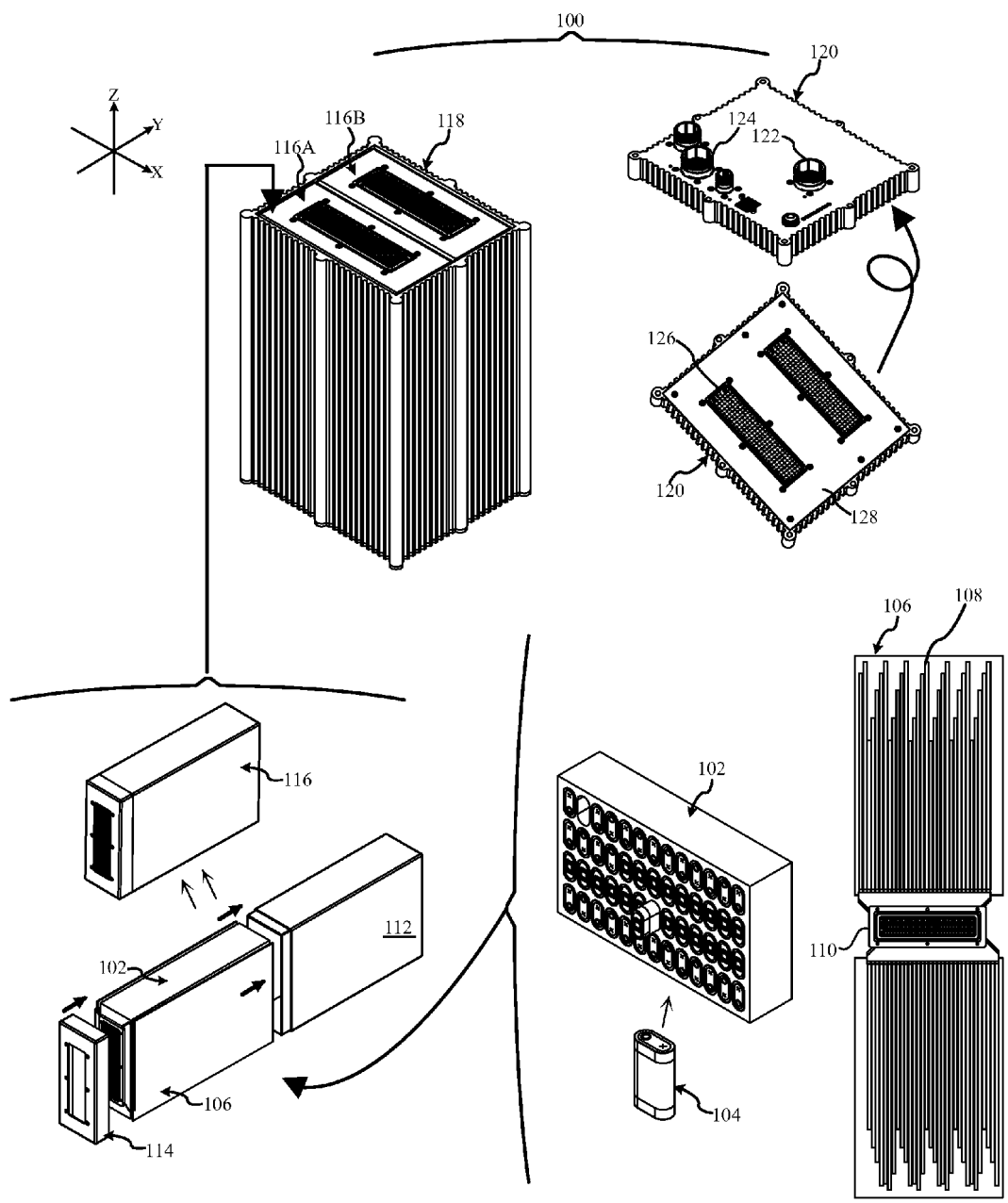
FIG. 1 illustrates a conceptual overview of the components for a non-hazmat shippable portable power device in accordance with at least one embodiment of the present invention.

Turning now to the figures, and more specifically FIG. 1, illustrated is a non-hazmat shippable portable power device ("NHSPD") 100 in accordance with at least one embodiment. As is further described in detail below, stated generally the NHSPD 100 is structured and arranged so that during transport, storage, or other periods of non-use, NHSPD 100 is not a battery as two or more cells are not electrically connected together.

Figure 3:
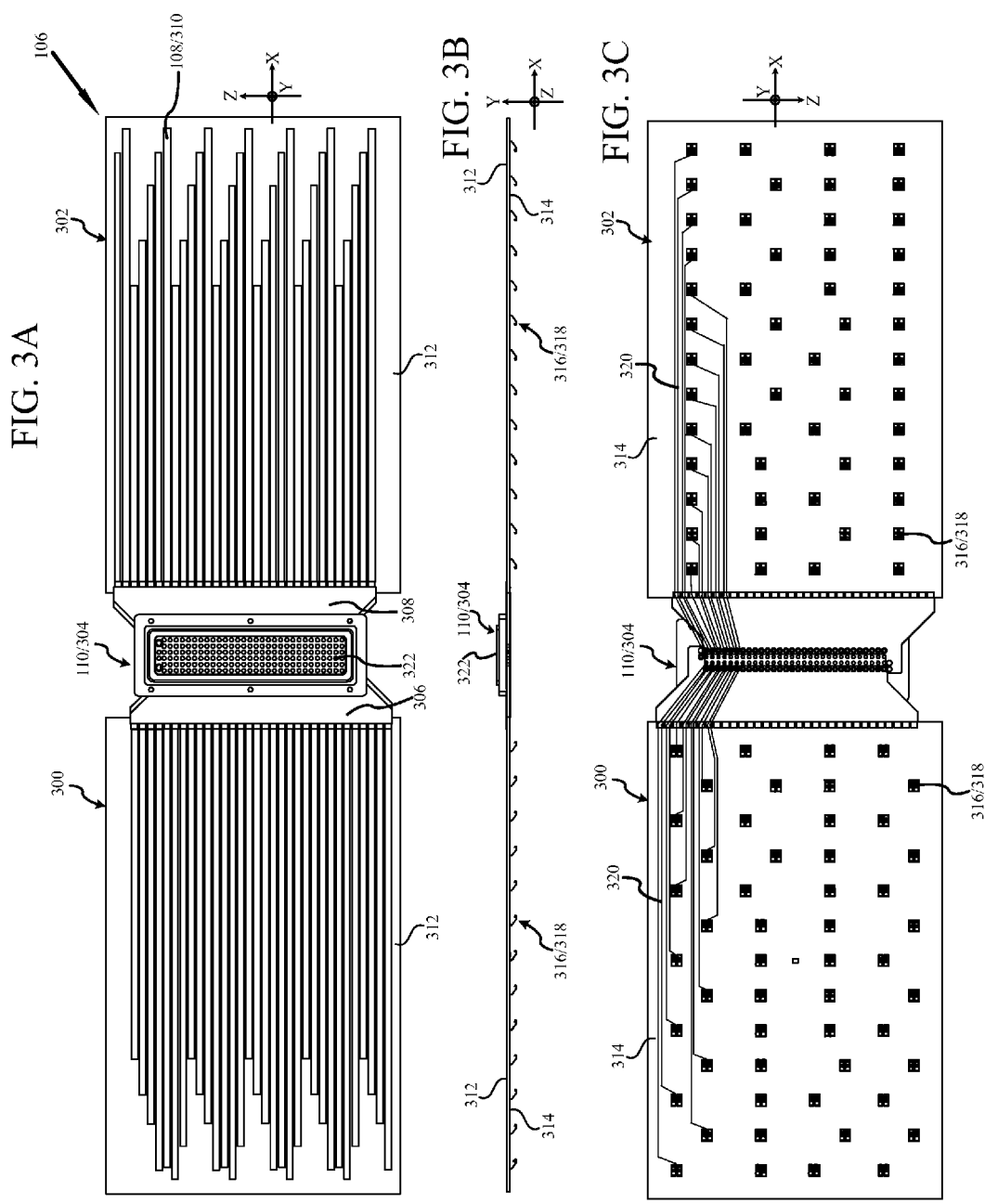
FIGS. 3A, 3B and 3C provide top, side and bottom views respectively of a backplane circuit board for a non-hazmat shippable portable power device in accordance with at least one embodiment of the present invention.

As shown, NHSPD 100 is provided by plurality of distinct components. Most generally, NHSPD 100 has a cell block 102 providing a plurality of electorally isolated electrochemical cells 104 and at least one backplane circuit board 106 which is disposed adjacent to the cell block 102. As is further discussed below, the backplane circuit board 106 provides a plurality of electrical conductors paired to group the positive and negative terminals of each electrochemical cell 104 with the cell block 102 to at least one common location without interconnection between the conductors. As shown, for at least one embodiment these electrical conductors are electrically isolated traces 108 which are shown in greater detail with respect to FIG. 3 discussed below, are structured and arranged to run from each cell to at least one grouping area 110 that provides a connection point for each trace 108.

As shown, for at least one embodiment, the backplane circuit board 106 is folded about the cell block and then inserted into a housing 112, and a spacer cap 114 is then affixed to the housing 112 to provide a cell block assembly 116. For at least one embodiment, two of these cell block assemblies 116A and 116B are then disposed in an environmentally rugged housing 118.

Also shown is a physically separate interconnection cap 120. This interconnection cap 120 has at least one external terminal which may provide both a positive and negative terminal as in a 38999 screw on connector or the like. For illustrative purposes and ease of discussion conceptually the terminals are shown as separate, one positive terminal 122 and at least one external negative terminal 124 which are electrically connected to a receiver section 126 on the underside 128 of the interconnection cap 120. This receiver section 126 is structured and arranged to receive and make physical electrical contact with each of the paired conductors of each cell block so as to provide a battery by interconnecting the conductors from each cell 104 at such time as the receiver section 126 is coupled to the grouped conductors of each cell block provided at each grouping area 110.

Again, it is to be understood and appreciated that cell block assemblies 116A and 116B are not batteries—indeed NHSPD 100 is not a battery unless and until the physically separate interconnection cap 120 is affixed in place. And, removal of the interconnection cap 120 from the housing 118, and more specifically the separation from cell block assemblies 116A and 116B once again returns NHSPD 100 to the state of not being a device defined as a battery and therefore a non-hazmat device suitable for transportation and shipment.

Moreover, to briefly summarize, provided is a system and method that permits safe transport of a non-hazmat rated device that can ultimately provide a functional battery, which in a functional state would potentially have been classified as a hazardous item.

Specifically, for at least one embodiment, the present invention includes at least one cell block providing a plurality of electrically isolated encased electrochemical cells 104 cells, each having one positive and one negative terminal, the cell block including a plurality of conductors paired to group the positive and negative terminals of each cell within the cell block in at least one common location without interconnection between the conductors.

A physically separate interconnection cap 120 having at least one external positive terminal 122 and at least one external negative terminal 124 electrically connected to a receiver section 126 structured and arranged to receive and make physical electrical contact with each of the paired conductors of the cell block 102 to provide a battery by interconnecting the conductors from each cell 104 at such time as the receiver section 126 is coupled to the grouped conductors of the cell block 102.

Figure 2:
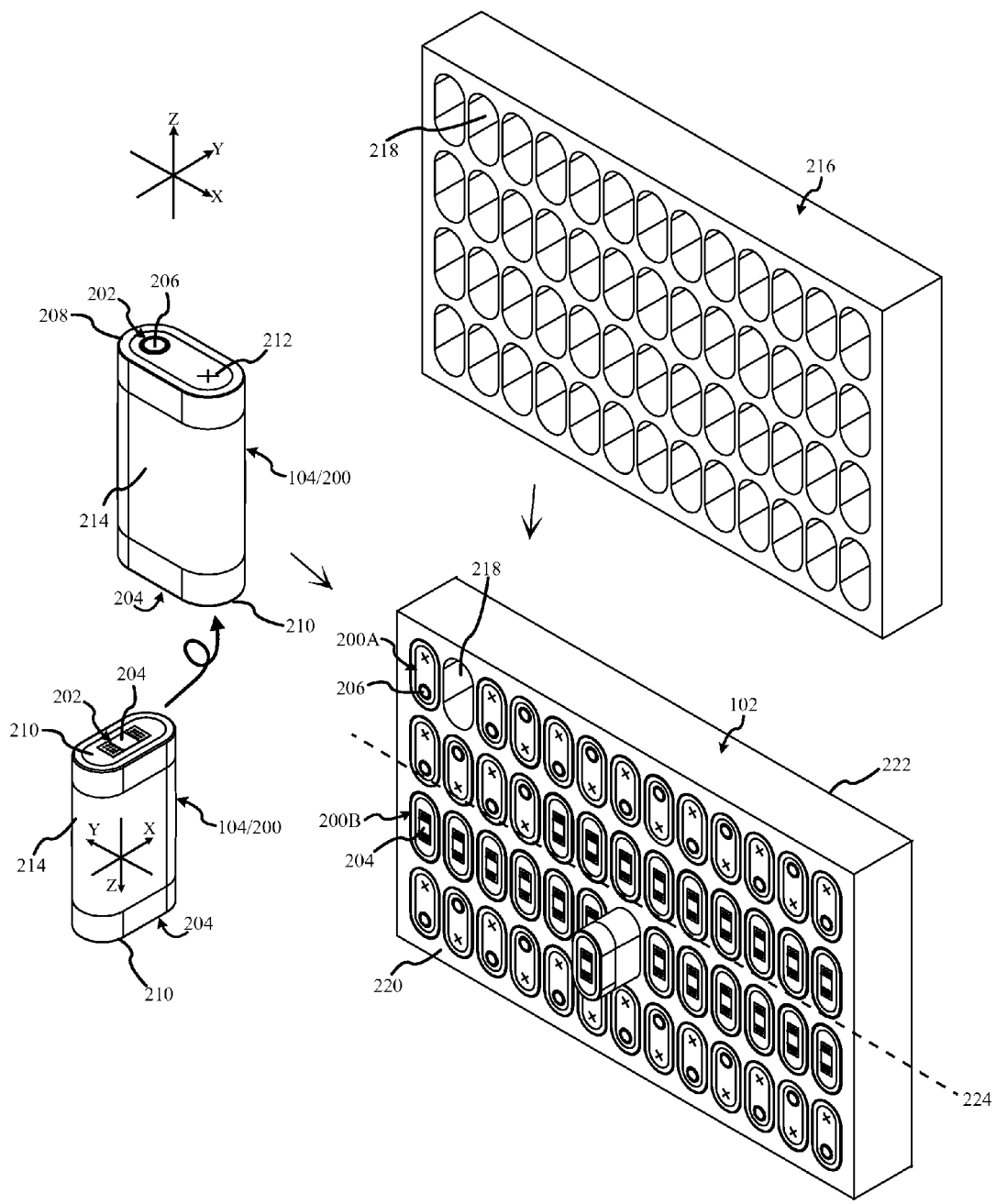
FIG. 2 illustrates an electrochemical cell, frame and cell block for a non-hazmat shippable portable power device in accordance with at least one embodiment of the present invention.

Turning from the overview of FIG. 1, FIG. 2 presents an enlarged view of both an exemplary electrochemical cell 200 and the cell block 102. Electrochemical cell 200 corresponds to electrochemical cell 104 shown in FIG. 1, but has been rendered in larger form to more fully appreciate that the electrochemical cell 200 has terminals 202. More specifically, at least one positive terminal and at least one negative terminal, and in some embodiments a neutral or ground terminal. The configuration of where the terminals provided on the cell 200 is generally consistent for each specific type and model of cell. For varying types of cells, the terminals may be provided from the same side or opposing sides.

More specifically, at least a positive terminal 204 and a negative terminal 206. For at least one embodiment as shown, the positive terminal 204 and negative terminal 206 are in predetermined locations. For at least one embodiment these pre-determined locations place the negative terminal 206 on a first end 208 of the electrochemical cell 104, and the positive terminal 204 on a second end 210 opposite from the first end 208. Cell 200 has been illustrated with an inverted view as well to further assist in appreciating the location of the positive terminal 204 on the second side 210. For yet an alterative embodiment, these pre-determined locations place each the positive terminal and negative terminal on the same common end of the cell 200, not shown.

For at least one embodiment, each cell 200 may also have a neutral terminal, a vent, or both. For conceptual illustration cells 200 have been illustrated with a vent 212, shown as an "X".

For at least one embodiment, each electrochemical cell 200 is a lithium based electrochemical cell, also known as Li-ion cells 200. Further still, for at least one embodiment, each Li-cell 200 is rechargeable. Each Li-cell 200 is encased in its own respective housing 214. Further, this housing may include one or more vents 212, to permit the venting of Li-cell 200 material without causing the Li-cell 200 to swell and potentially explode.

The cell block 102 is provided by a frame 216 having a plurality of apertures 218, each structured and arranged to receive one Li-cell 200. For at least one embodiment the frame 216 is constructed of a non-conductive material such as foam, plastic, polymer or other non-conductive material. Collectively, the apertures 218 isolated and orient each cell 200 in a predetermined position such that the positive terminal 204 and negative terminal 206 of each cell 200 is also in a predetermined position.

Moreover, the cell block 102 is established by deposing a Li-cell 200 in each aperture 218. As shown, for at least one embodiment, a first set of Li-cells 200 are oriented to provide their negative terminals 206 to a first side 220 of the cell block 102 as indicated by exemplary Li-cell 200A. A second set of the Li-cells 200 are oriented to provide their positive terminals 204 to the first side 220 of the cell block 102 as indicated by exemplary Li-cell 200B.

For yet another embodiment, not shown, where the positive terminal 204 and negative terminal 206 of each cell 200 are disposed on a common end, a first subset of cells 200 may be disposed with the terminals 202 on the common end disposed towards the first side 220 of cell block 102 and a second subset of cells may be disposed with the terminals 202 on the common end disposed towards the second side 222 of the cell block 102. Of course it is understood and appreciated that reference to a first side 220 and second side 222 of the frame as well as the top end/first end 208 of the cell and bottom end/second end 210 are for ease of discussion and limitation.

The pattern produced by the orientation towards the first side 220 or the second side 222 of the respective Li-cells 200 may be such that the first side 220 mirrors the second side 222, so that the cell block 102 orientation is neutral—which is to say that when revolved around a longitudinal axis 224 the apparent pattern does not change. For an alternative embodiment, such as that shown in FIG. 2 the pattern of the first set of cells 200A is distinct from the pattern of the second cells 200B such that when revolved around the longitudinal axis 224 the apparent pattern does change.

For at least one embodiment, the cells 200 are held in place within each aperture 218 by friction grip of the material comprising the frame 216. For at least one alternative embodiment, the cells 200 are glued or otherwise permanently fixed in place. For yet another embodiment, the material comprising the frame 216 includes a phase change material. Should one or more cells 200 experience a thermal event, the phase change material will absorb the heat and act to protect the remaining cells 200 and NHSPD 100. In addition, in such an event the phase change material may be one that will change color when subjected to heat of a pre-determined level. Phase change material may also be used that will change color when in contact with the internal material of an Li-cell such as would occur when a cell ruptures or vents. As such, should one or more cells ever fail in a cell block 102, the damaged cell may be quickly identified by visual inspection of the cell block 102.

FIGS. 3A, 3B and 3C provide a top view, side view and bottom view of backplane circuit board 106. Shown flat in FIGS. 3A, 3B and 3C it is understood and appreciated that the backplane circuit board 106 is structured and arranged to be disposed about the cell block 102 as to be in proximate contact with both the first side 220 and second side 222 of the cell block 102, and more specifically in physical and electrical contact with the positive terminal 204 and negative terminal 206 of each cell 200 as oriented towards the first side 220 and the second side 222.

Moreover, the backplane circuit board 106 is semi-flexible. For at least one embodiment, the backplane circuit board 106 is provided by a first circuit board 300 and a second circuit board 302, each board extending in an opposite direction from a grouping pin connector 304, which for at least one embodiment provides the grouping area 110 as shown in FIG. 1. The first circuit board 300 is coupled to the grouping pin connector by flexible ribbon cable 306 and the second circuit board 302 is coupled to the grouping pin connector by flexible ribbon cable 308. Of course, for at least one embodiment, ribbon cable 306 and ribbon cable 308 may be exposed ends of the same ribbon cable—the grouping pin connector 304 installed so as to electrically contact and bind with distinct electrical traces from the first circuit board 300 and the second circuit board 302.

As is shown most clearly in the top view of FIG. 3A, the backplane circuit board 106 and more specifically the first circuit board 300 and the second circuit board 302 each provide a plurality of distinct and electrically isolated traces 310.

As is understood and appreciated in the fabrication of printed circuit boards, these electrical traces are provided on a first side 312 of each circuit board and typically covered with a non-conductive coating to protect the traces and prevent inadvertent shorting.

Contact with each trace is made by providing a hole extending through the circuit board from the second side 314 (shown in FIGS. 3B and 3C) to the first side 312. As the location of each cell 200 and the respective positive terminal 204 and negative terminal 206 is pre-determined by the alignment and positioning of each aperture 218 of the frame 216, the location of each through hole to provide electrical connection points 316 as terminal connectors between each cell terminal and each isolated trace may also be determined.

Moreover as may be appreciated in the side view of FIG. 3B, for at least one embodiment the electrical connection points 316 are spring connectors 318. As such, physical pressure of the backplane circuit board 106 the cell block 102 will establish the electrical connections between the electrically isolated encased electrochemical cells 200 and their associated isolated traces 310.

As the traces 310 of the backplane circuit board 106 are isolated from each other, in at least one embodiment the use of a first circuit board 300 and a second circuit board 302, i.e., a top and bottom board, permits even greater spacing between the traces upon each board and thus further reduces the possibility of accidental short.

In FIG. 3C a plurality of distinct traces are indicated by conceptual trace lines 320, provided to show that for each of the spring connectors 318 in the top rows of backplane circuit board 106 an electrically separate trace extends from each spring connector 318 to the common grouping area 110 provided by grouping pin connector 304. Additional electrical trace lines have not been show for ease of illustration and discussion. And of course, these trace lines 320 are further understood and appreciated to exist as elements of the trace lines 310 provided on the top, or first side 312.

In at least one alternative embodiment, trace lines 310 are provided on both the first side 312 and the second side 314 so as to even further provide electrical isolation between the various traces 310. Moreover, as an element of the present invention is to provide isolated extension of the positive terminal 204 and negative terminal 206 of each cell 200 to a common grouping point, the use of the first side 312 or second side 314 or both sides of the backplane circuit board 106 and more specifically the first circuit board 300 and the second circuit board 302 is a matter for design and fabrication simplicity and/or durability of the resulting NHSPD 100, and not a limitation.

With respect to the above discussion of the electrically isolated traces 108/310/320, and with respect to FIG. 3A once again, it is understood and appreciated that the common grouping area 110 as provided by grouping pin connector 304, provides a connection point 322 for each isolated traces 108/310/320. For the embodiment as shown in the figures, connection point 322 is a pin socket, provided by grouping pin connector 304. For alternative embodiments, connection point 322 may be a pin, connection pad, spring connector, or other such desired and adaptable element suitable for providing a connection point 322.

As noted above with respect to the discussion of FIG. 2, for at least one embodiment, each cell 200 has a third terminal, such as a neutral terminal, not shown. For an embodiment wherein NHSPD 100 incorporates cells 200 having a neutral terminal, in at least one embodiment the backplane circuit board 106, may also provide a distinct electrical trace for each neutral terminal, as shown by conceptual trace lines 320, provided to show that for each of the spring connectors 318 in the top right row of backplane circuit board 106, i.e., the top row of second circuit board 302, an electrically separate trace extends from each spring connector 318 to the common grouping area 110 provided by grouping pin connector 304.

As also noted above with respect to the pattern of placement of each cell 200 in the frame 216 to provide cell block 102, for at least one embodiment, the layout pattern of traces 310 and spring connectors 318 is mirrored on both the first circuit board 300 and the second circuit board 302, such that orientation of the backplane circuit board 106 with respect to the cell block 102 during device assembly is immaterial.

For at least one alternative embodiment, the layout pattern of traces 310 and spring connectors 318 is distinct on both the first circuit board 300 and the second circuit board 302 such that the orientation of the backplane circuit board 106 is keyed to the orientation of the cell block 102 during device assembly.

Figure 4:
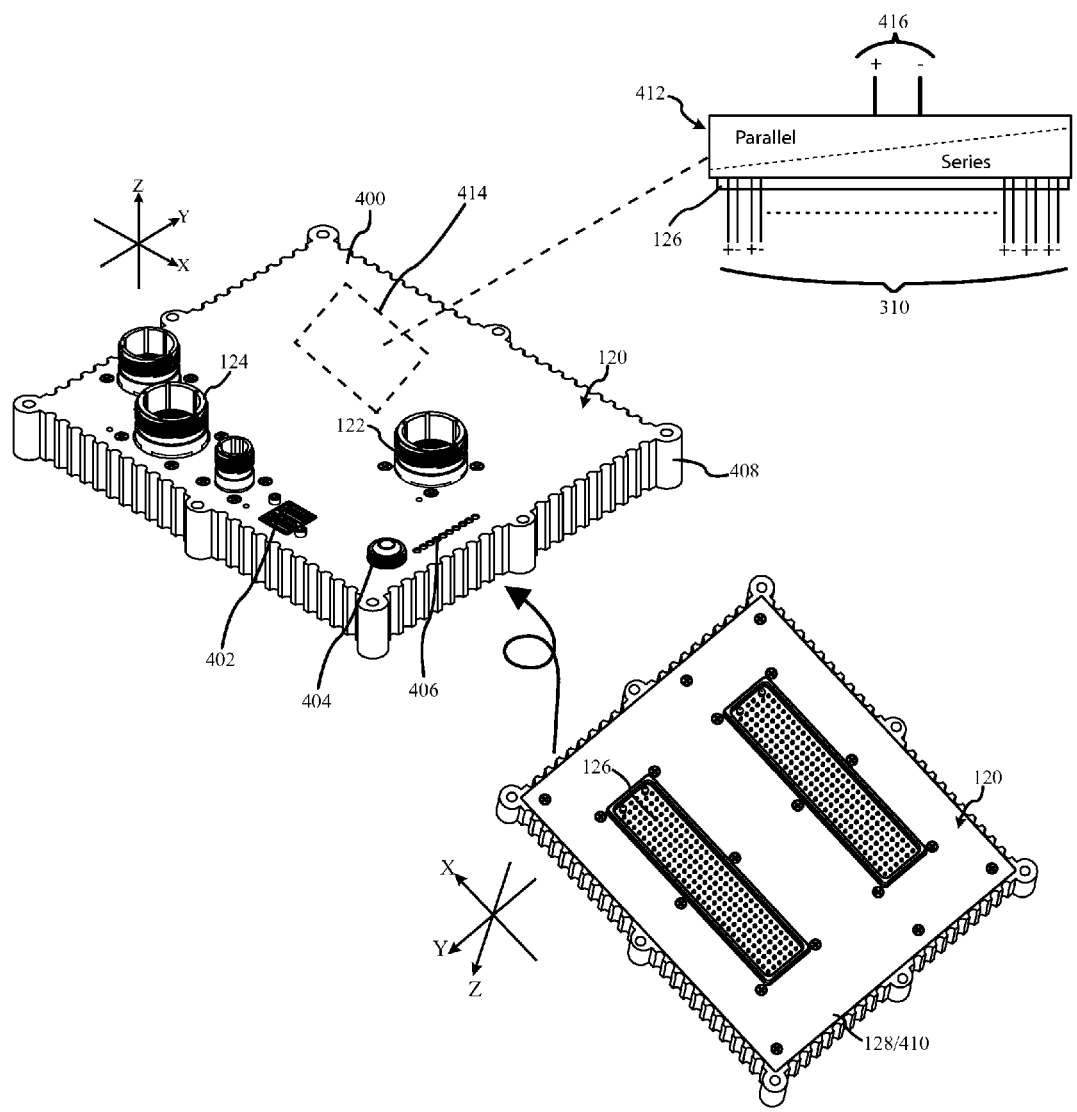
FIG. 4 illustrates a separate interconnection cap for a non-hazmat shippable portable power device in accordance with at least one embodiment of the present invention.

FIGS. 4A and 4B illustrate the top and bottom of the physically separate interconnection cap 120 respectively. As shown, the top 400, and therefore external part of the separate interconnection cap 120 has at least one positive terminal 122 and at least one negative terminal 124. In varying embodiments, additional terminals may also be provided, such as for example one or more USB terminals 402, or the like. In varying embodiments, the separate interconnection cap 120 may also provide an On/Off switch 404 and a charge indicator 408.

As shown, the separate interconnection cap 120 also provides one or more structures 408 by which the separate interconnection cap 120 may be affixed in place so as to couple to one or more common grouping areas 110 provided by the grouping pin connector 304 of one or more cell blocks 102.

The receiver section 126 shown on the underside 410 of separate interconnection cap 120 achieves this coupling. Moreover, in at least one embodiment, a separate receiver section 126 is provided for each cell block 102. For an embodiment where the grouping area 110 of a backplane circuit board 106 is provided by a female pin connector, the receiver section 126 of the separate interconnection cap 120 is provided by a corresponding mating mail pin connector. For an embodiment where the grouping area 110 of a backplane circuit board 106 is provided by a male pin connector, the receiver section 126 of the separate interconnection cap 120 is provided by a corresponding mating female pin connector.

Moreover, unless and until the separate interconnection cap 120 is disposed upon the cell block 102 such that the common grouping area 110 provided by grouping pin connector 304 of the cell block is electrically coupled to the receiver section 126 of the separate interconnection cap 120, all traces 310 from all cells 200 remain unconnected to one another in any fashion. Upon mating of the traces 310 in the common grouping area 110 provided by grouping pin connector 304 of the cell block and the receiver section 126, the traces 310 from each cell 200 may be combined.

As shown by conceptual wiring diagram 412 for circuit 414, the incoming traces 310 presented to the receiver section 126 are combined by internal circuitry within the separate interconnection cap 120 so as to provide at least one set of output positive and negative terminals 416. In addition, for at least one embodiment, the separate interconnection cap 120 further includes circuitry structured and arranged to balance and monitor the encased electrochemical cells 200.

For at least one embodiment, the interconnection of the traces 310 from each cell 200 by the circuit 414 of the interconnection cap 120 is structured and arranged to provide parallel interconnection between the cells 200. For at least one embodiment, the interconnection of the traces from each cell 200 by the circuit 414 of the interconnection cap 120 is structured and arranged to provide series interconnection between the cells 200. For yet another embodiment, the interconnection of the traces from each cell 200 by the circuit 414 of the interconnection cap 120 is structured and arranged to provide at least two sets of output terminals one supported by a subset of cells 200 connected in series and another supported by a subset of cells connected in parallel. For still yet another embodiment the selection of interconnection of the cells 200 as parallel or series is user adjustable.

Figure 5:
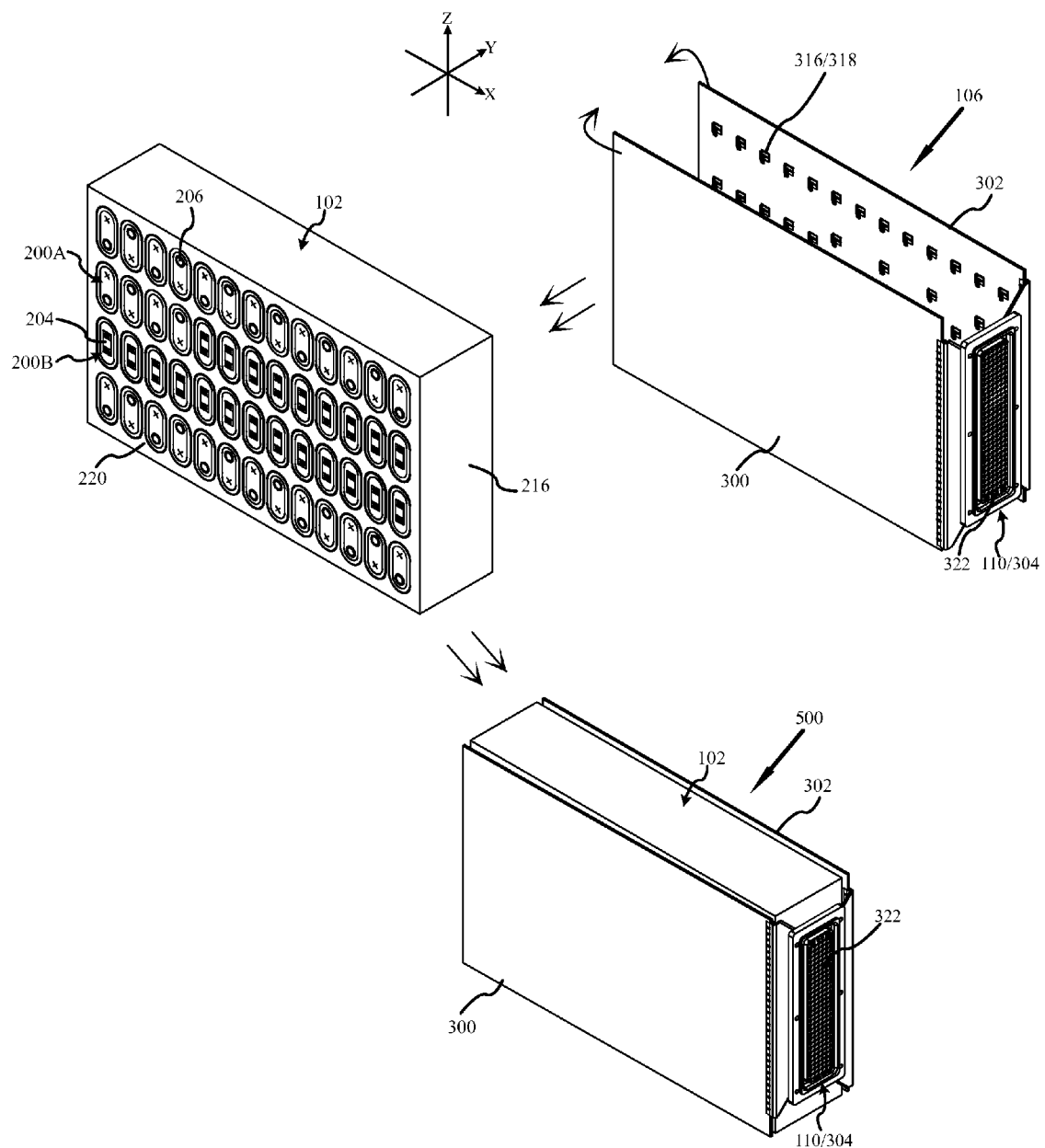
FIG. 5 is a illustrates a backplane circuit board disposed about a cell block for a non-hazmat shippable portable power device in accordance with at least one embodiment of the present invention.

As shown in FIG. 5, as the backplane circuit board 106 is flexible, the first circuit board 300 and second circuit board 302 are moved towards each other such that the spring connectors 316 of each are disposed towards one another, and the backplane circuit board 106 is disposed about the cell block 102, so as to provide a backplane circuit board 106 and cell block 102 assembly 500.

FIG. 6A is a perspective view showing the backplane circuit board 106 with partial cutaway as disposed about the cell block 102 as a backplane circuit board 106 and cell block 102 assembly 500. FIG. 6B is a cross sectional view of the backplane circuit board 106 and cell block 102 assembly 500, shown in FIG. 6A.

Moreover, as shown in FIG. 6A, as between the cells 200 in dotted relief 602 beneath the first circuit board 300 of the backplane circuit board 106 and those illustrated in the clear 604, the positioning of the backplane circuit board 106 about the cell block 102 and the alignment between the terminals 202 of each cells and the isolated traces 108/310/320, of which traces 606 shown as eight dotted lines are exemplary, can be more fully appreciated. A full complement of traces 108/310/320 has not been illustrated for ease of discussion and illustration.

As shown, each cell 200 within the cell block 102 is a distinct and isolated cell 200. It is also to be appreciated that the grouping area 110 providing a common connection point 322 provided by grouping pin connector 304 does indeed provide a centralized grouping area 110 for all of the distinct traces. It should also be also apparent that the backplane circuit board 106 by being disposed over the cells 200 is also protecting the cells 104/200.

As is more easily perceived in FIG. 6B showing a cross section of the assembly 500 shown in FIG. 6A, only the spring connectors 318 extending from each trace are in contact with the terminals 202 of the cells 200. As noted above with respect to FIG. 2, for at least one embodiment the cells 200 have a positive terminal 204 and a negative terminal 206 provided from the opposing ends, e.g., negative terminal 206 on first end 208 and positive terminal 204 on the second end 210.

As such, in the cross section of FIG. 6B it is appreciated that for at least one embodiment the only conductive elements in contact with the cells 200, and more specifically in contact with the terminals 202 of the cells 200 at either end of the cells 200 are the spring connectors 318. Indeed this additional isolation and limitation of contacts is yet another advantageous feature of NHSPD 100.

It is also to be noted that the spring connectors 316 are disposed in contact with their respective terminals 202 of each cell 200 by physical force. Moreover, the contacts are not soldered to the terminals 202. Indeed for at least one embodiment the use of the paired conductors, i.e., electrically isolated traces 108/310/320 to group the positive terminals 204 and negative terminals 206 of each cell 200 at the grouping area 110 providing a common connection point 322 provided by grouping pin connector 304 is achieved without physical modification of the individual cells 200 or additions to the individual cells, such as for example the soldering of traces or wires directly to the cells 200.

Of course, as shown in FIGS. 5, 6A and 5B the backplane circuit board 106 is shown disposed about the cell block 102 as assembly 500, but absent is a structure that will maintain and perpetuate their respective alignments and provide a compressive force so as to establish and maintain the interconnections between the spring connectors 318 and cell 200 terminals 202 for the assembly 500

Figure 7:
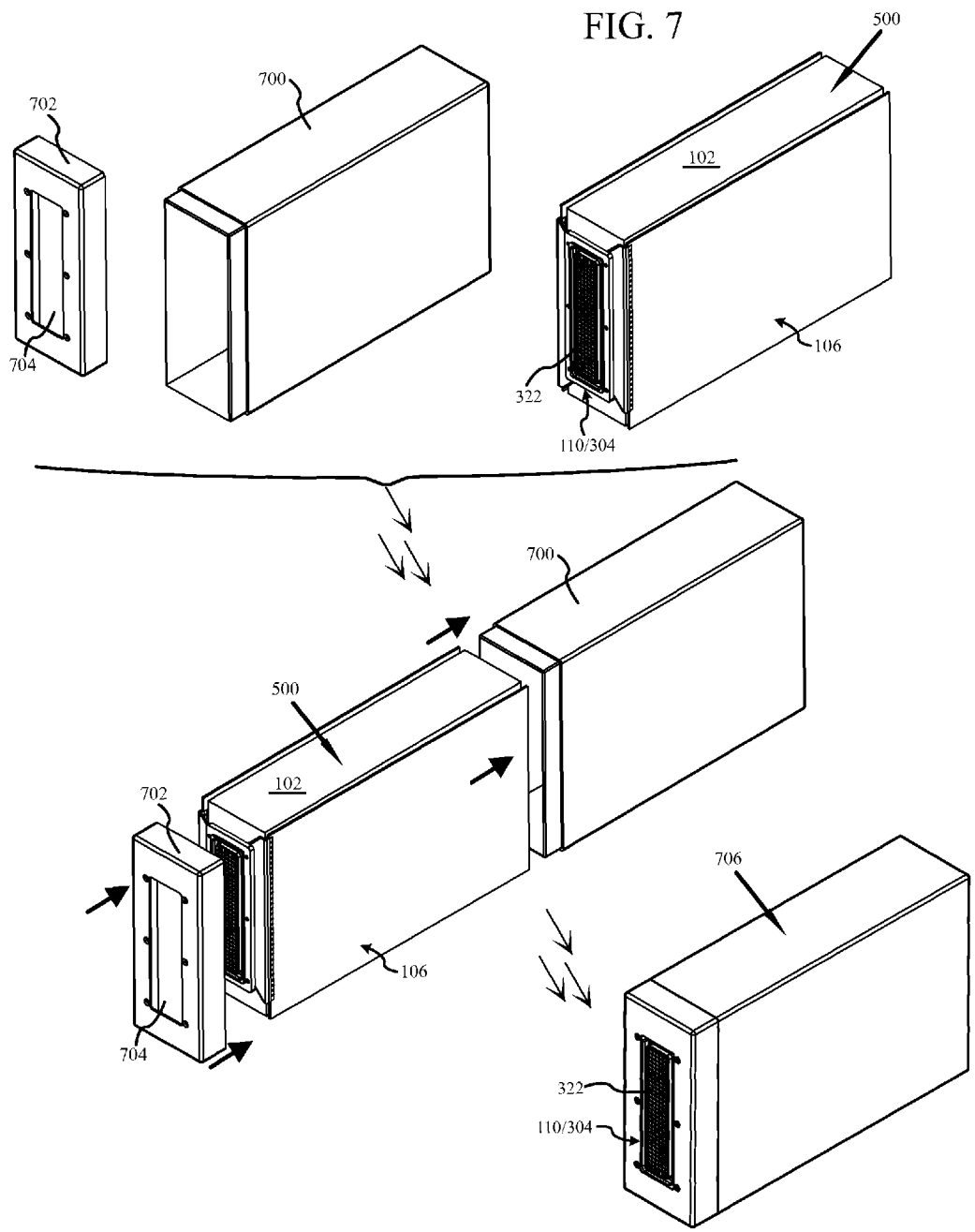
FIG. 7 illustrates the backplane circuit board disposed about the cell block of FIG. 5 disposed within a housing to provide a cell block assembly for a non-hazmat shippable portable power device in accordance with at least one embodiment of the present invention.

As shown in FIG. 7 the backplane circuit board 106 and cell block 102 assembly 500 is disposed into the chamber of a housing 700. Moreover disposing the assembly 500 within the chamber is a squeeze fit such that force is exerted upon the spring connectors 318 of the backplane circuit board 106 and the terminals 202 of each cell 200 to which they are aligned.

For at least one embodiment, this housing 700 is formed from a non-conductive material such as plastic, foam, polycarbonate, or other non-conductive material as may be appropriate for the nature of the portable power device ultimately provided. In addition, as shown, a non-conductive spacer and/or cap 702 may also be disposed over the end of the backplane circuit board 106 and cell block 102 assembly 500 once disposed in the housing 700. This spacer/cap 702 has a generally central aperture 704 so as to allow access to the grouping area 110 providing a common connection point 322 provided by grouping pin connector 304 of the backplane circuit board 106.

With the spacer/cap 702 in place and coupled to the housing 700, provided now is a cell block assembly 706. Cell block assembly 706 corresponds to cell block assembly 116 as shown in smaller form in FIG. 1. The cell block assembly 116/706 as shown is not a battery.

Each of the encased electrochemical cells 104 (e.g., Li-ion cells 200—not shown as they are concealed by backplane circuit board 106) within the cell block assembly 706 are still electrically isolated from each other. They have been arranged in a specific and advantageous configuration so as to permit the grouping of their respective terminals 202 in a common location, and a connection point 322 is established to facilitate such future connection, but in this present configuration no two cells 104/200 are in any way electrically interconnected. This is fundamental for the definition of a battery as noted above specifically states "two or more cells which are electrically connected together."

For at least one embodiment, this cell block assembly 706, like the cell block 102 is a non-hazmat shippable component because each of the Li-ion cells 200 has the distinction of being electrically independent as prescribed by the regulations. For at least one other embodiment, the cell block 102 with cells 200 may be packaged and shipped without the backplane circuit board 106 disposed as described, this assembly being performed by an end user after shipment is received. As the cells 200 are prepositioned in the cell block 102 and the backplane circuit board 106 is pre-established with the isolated electrical traces and spring connectors specifically pre-placed so as to contact the terminals 202 of the cells 200 within the cell block 102, disposing the backplane circuit board 106 about the cell block 102 and disposing it within a housing 700 and attaching the spacer/cap 702 may be performed by a user in the field without specialized tooling or training and in a very short time period.

Figure 8:
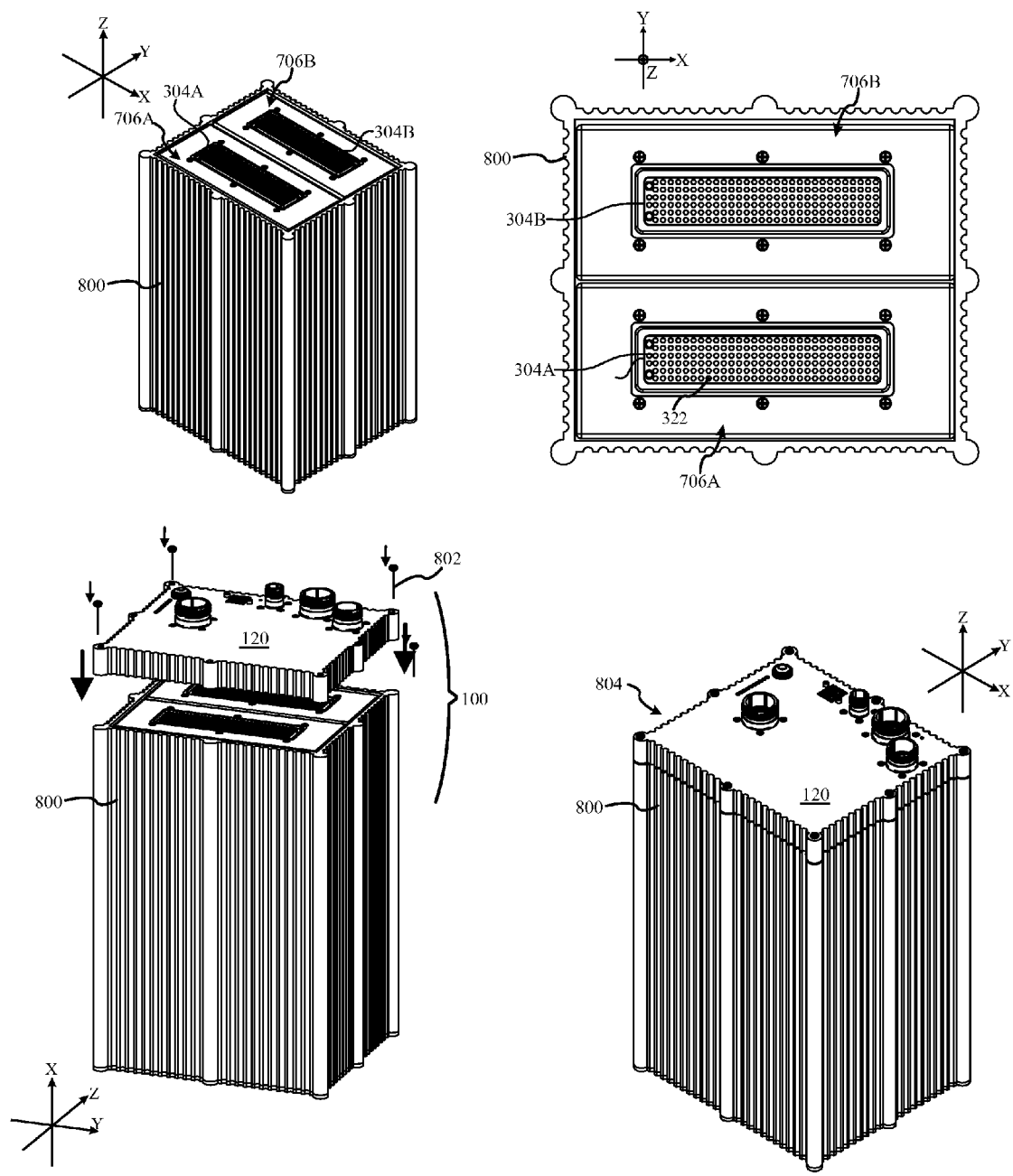
FIG. 8 illustrates the separate interconnection cap and two cell block assemblies initially separate to provide a non-hazmat shippable portable power supply and then assembled to provide a battery in accordance with at least one embodiment of the present invention.

In FIG. 8, two cell block assemblies 706A/116A and 706B/116B are shown disposed within yet another housing 118, i.e. an outer housing 800. As shown, grouping pin connector 304A is exposed and accessible for cell block assembly 706A and grouping pin connector 304B is exposed and accessible for cell block assembly 706B.

As suggested by the illustration, outer housing 800 may be rugged and suitable for field use in a wide variety of environments, including but not limited to wet, cold, windy, dry, hot and humid environments. As shown, the separate interconnection cap 120 is disposed upon the cell block assemblies 706A and 706B to provide the assembled device as a functional lithium based battery. The separate interconnection cap 120 is fixed in place to the housing 800 in at least one embodiment with the use of an attacher 802 such as screws or bolts which pass through the separate interconnection cap 120 and bind to the outer housing 800.

As discussed above with respect to FIG. 4 the separate interconnection cap 120 contains internal circuit 414 so as to interconnect the encased electrochemical cells 104 (Li-ion cells 200) of the cell bock assembly 706 and thus provide the functioning battery. As noted, in varying embodiments the interconnections provided by the separate interconnection cap for the li-ion cells may be in parallel, in series, and in varying combinations. Further, for at least one embodiment these interconnections as series, parallel or varying combination may be user adjustable.

For at least one embodiment each cell block assembly 706 has one hundred and four Li-ion cells 200. Further, for at least one embodiment the combined weight of the Li-ion cells in each cell block assembly is less than 5 Kg.

Moreover, for at least one embodiment of NHSPD 100, prior to coupling the physically separate interconnection cap 120 to the grouped conductors of the cell block assembly 706 the NHSPD 100 is an inoperable collection of electrically isolated cells 200 each having less than 20 watt hours. However, upon coupling of the physically separate interconnection cap 120 to the grouped conductors of the cell block assembly 706, the NHSPD 100 is operable as a rechargeable battery 804, and in at least one embodiment has an energy capacity of at least 100 watt hours.

It is understood and appreciated that when HNHSP 100 is in the fully assembled state so as to provide battery 804 NHSPD 100 is not shippable as a non-hazmat component. The separate interconnection cap 120 must be removed for the non-hazmat shippable status to once again apply; with the separate interconnection cap 120 unattached all the cells 200 within NHSPD 100 are electrically isolated and unconnected to one another.

Of course, as FIG. 8 suggests that two cell block assemblies 706A and 706B may be combined in the resulting lithium based battery. It is understood and appreciated that configurations with just one cell block assembly 706 may also be provided. Likewise too, configurations with more than two cell block assemblies 706 may also be provided.

To briefly summarize the above description, for at least one embodiment, provided is a NHSPD 100, including: at least one cell block 102 providing a plurality of electrically isolated encased electrochemical cells 104/200 each in a predetermined location, each cell 104/200 having one positive terminal 204 and one negative terminal 206 in a predetermined location. At least one backplane circuit board 106 is disposed adjacent to each cell block 102 and, for each positive terminal 204 and negative terminal 206 of each cell 104/200, the adjacent circuit board 106 providing electrically isolated traces 108/310/320 from each cell 104/200 to at least one grouping area 110, the grouping area 110 providing a connection point 322 for each trace 108/310/ 320. The NHSPD 100 further including a physically separate interconnection cap 120 having at least one external positive terminal 122 and external negative terminal 124 connected by electrical circuitry 414 to at least one connector 126 structured and arranged to physically connect with each connection point 322 of each trace 108/310/320 at such time as the interconnection cap 120 is disposed adjacent to the at least one cell block 102 such that the cap connector 126 engages the trace connection points 322.

Figure 9:
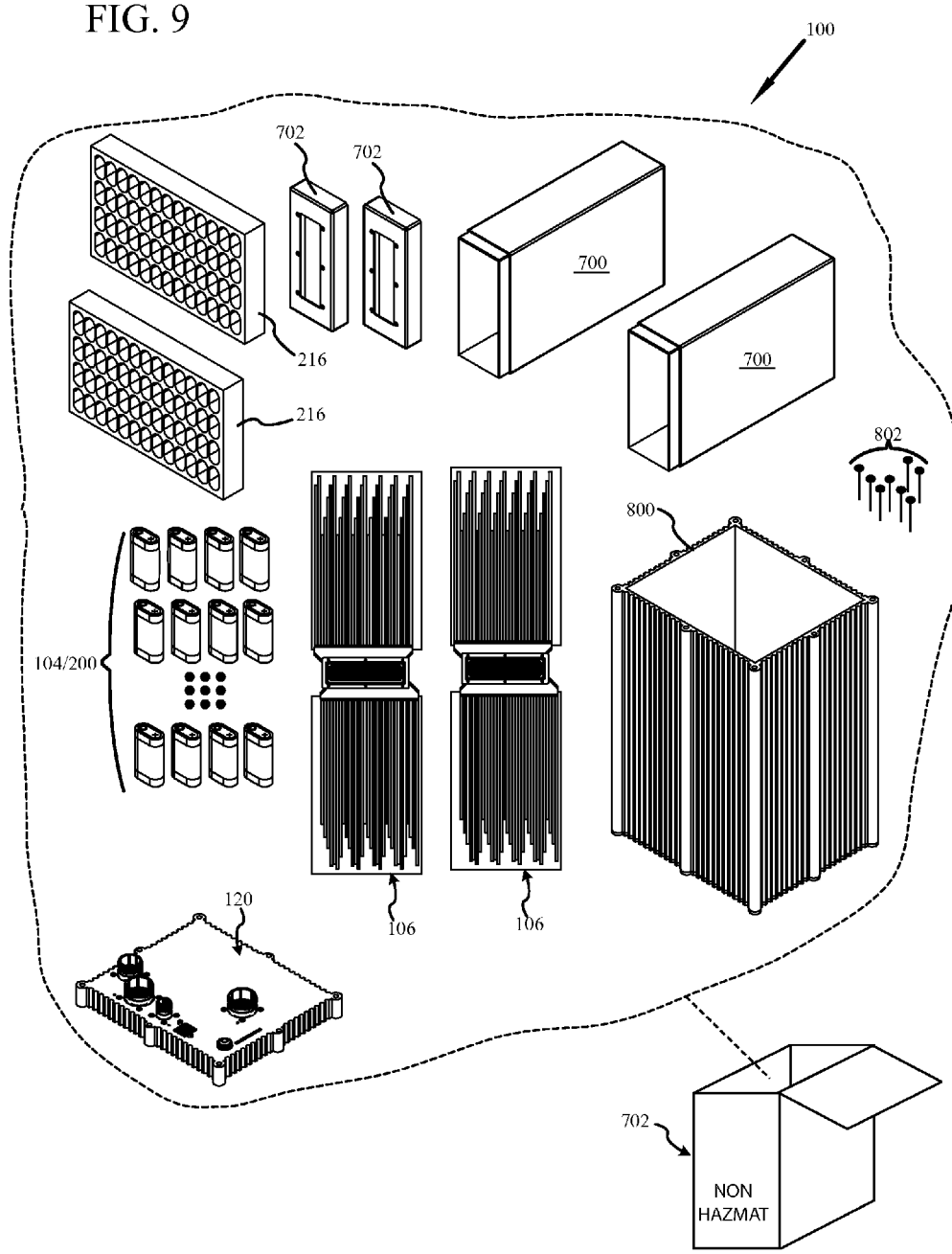
FIG. 9 illustrates a kit for providing a non-hazmat shippable portable power device in accordance with at least one embodiment of the present invention.

Moreover the above described components of the frame 216, isolated encased electrochemical cells 102 (i.e. Li-ion cells 200), backplane circuit board 106, and separate interconnection cap 102, with or without one or more housings 700/800 and or spacers/caps 704 may be provided as a kit 900, shown in FIG. 9. The elements of this kit 900 may be shipped collectively or as distinct items. In either form, as the encased electrochemical cells 102 (i.e. Li-ion cells 200) are electrically isolated from each other, the kit 900 advantageously provides the components for a NHSPD 100 without requiring hazardous material certification, testing, increased shipping, and or other costs in terms of time and money. In addition, as described above, it is understood and appreciated that the components of the kit 900 may be assembled without special tools or solder. Moreover, for at least one embodiment, all elements of NHSPD 100 including the attachers 802 may be press fit together. For yet another embodiment, the kit may include a screwdriver or wrench for connecting the attachers 802.

Moreover, for at least one embodiment NHSPD 100 is provided as non-hazmat shippable kit, including: at least one cell block 102 providing a plurality of electrically isolated encased electrochemical cells 104/200 each in a predetermined location, each cell 104/200 having one positive terminal 204 and one negative terminal 206 in a predetermined location; at least one backplane circuit board 106 to be disposed adjacent to each cell 102 block and for each positive terminal 204 and negative terminal 206 of each cell 104/200 providing electrically isolated traces 108/310/320 from each cell 104/200 to at least one grouping area 110, the grouping area 110 providing a connection point 322 for each trace 108/310/320; a housing 700 having a chamber structured and arranged to receive the cell block 102 and disposed backplane circuit board 106; a non-conductive spacer 702 structured and arranged to fit around the connection points 322 of the backplane circuit board 106 when the backplane circuit board 106 and cell block 102 are disposed within the housing 702; a physically separate interconnection cap 120 having at least one positive terminal 122 and external negative terminal 124 connected by electrical circuitry 414 to at least one connector 126/304 structured and arranged to electrically connect with each connection point 322 of each trace 108/310/320 at such time as the interconnection cap 120 is disposed adjacent to the at least one cell block 102 such that the cap 120 connector 126/304 engages the trace 108/310/320 connection points 322; and an attacher 802 structured and arranged to attach the physically separate interconnection cap 120 to housing 700/800 and align the interconnector cap 120 connector 126/304 to electrically couple to the grouped connection points 322 of each trace 108/310/320 to provide a battery with a protective housing 800.

Indeed, yet another embodiment of the present invention is for a method of providing a non-hazmat shippable portable power supply by providing the above discussed components in the initial passive state wherein the encased electrochemical cells (Li-ion cells) are electrically isolated from each other as discussed above.

Figure 10:
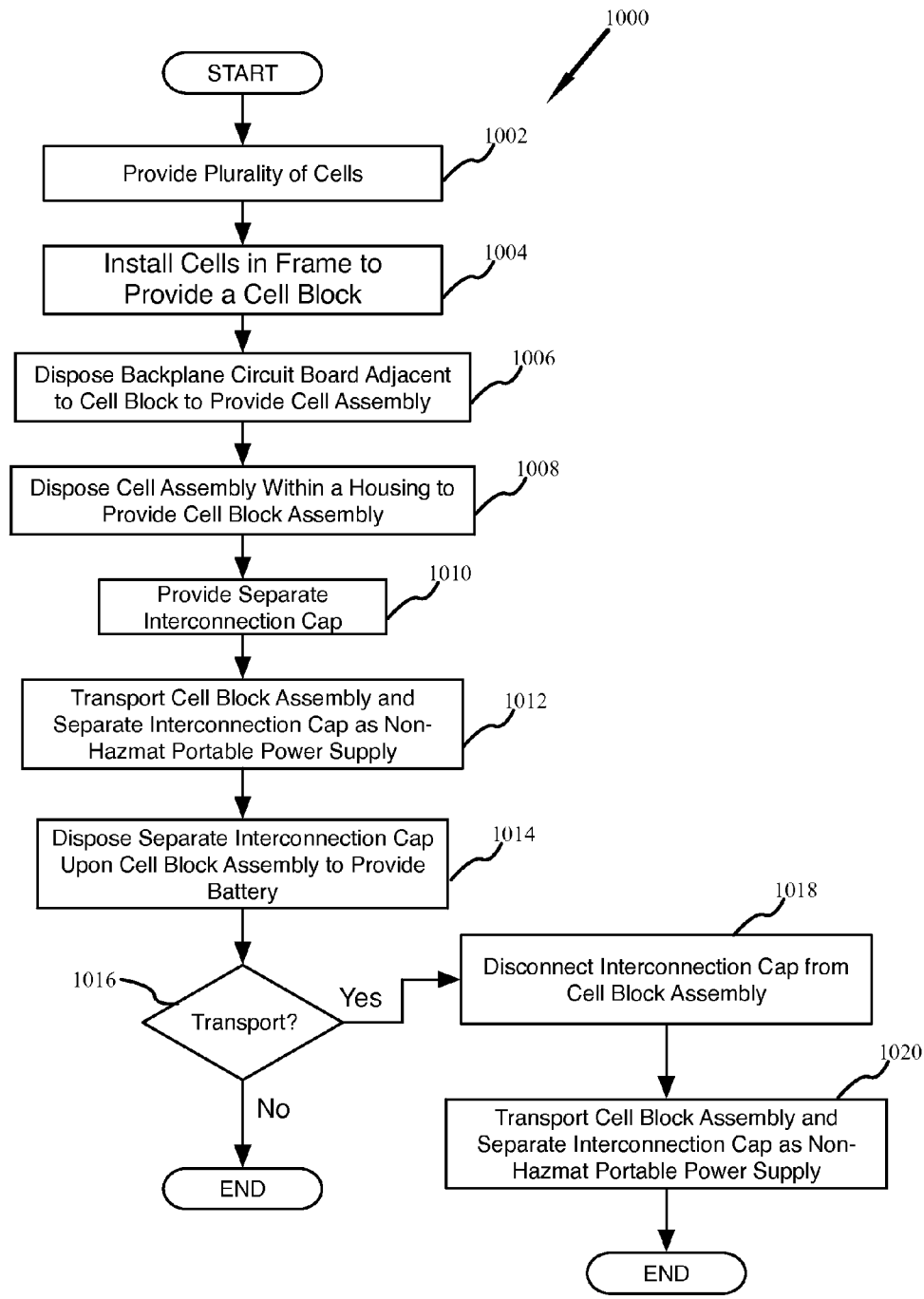
FIG. 10 is a high level flow diagram for a method of providing a non-hazmat shippable portable power device in accordance with at least one embodiment.

FIG. 10 in connection with FIGS. 1-9 as described above provides a high level flow diagram for a method 1000 of providing NHSPD 100 in accordance with at least one embodiment. It will be appreciated that the described method need not be performed in the order in which it is herein described, but that this description is merely exemplary of one method 1000 for providing NHSPD 100.

In general, method 1000 commences by providing a plurality of electrochemical cells 104, such as Li-cells 200, block 1002. Method 1000 continues by installing these cells in a frame 216 to provide a cell block 102, block 1004.

A backplane circuit board 106 is disposed adjacent to the cell block 102 to provide a cell assembly 500, block 1006. This cell assembly 500 is then disposed within a housing to provide a cell block assembly 706, block 1008.

If not previously provided, a separate interconnection cap 120 is now also provided, block 1010. At this point, the cells within NHSPD 100 are all distinct elements—moreover NHSPD 100 does not meet the definition of a battery ("two or more cells which are electrically connected together") as no two (2) cells 200 are electrically connected together.

As such, NHSPD 100 as the cell block assembly 706 and separate interconnector cap 120 are non-hazmat elements as a non-hazmat portable power supply and therefore permitted for general transport, block 1012.

Upon receipt and in an environment desiring electrical power from NHSPD 100 the separate interconnection cap 120 is disposed upon the cell block assembly 706 so as to provide functional battery 804, block 1014.

If it is desired to transport NHSPD 100 once again as a non-hazmat portable power supply, decision 1016, the separate interconnection cap 120 is once more removed—rendering all of the cells within the cell block assembly 706 once again distinct elements which are not electrically connected together, block 1018.

In this state once again, the NHSPD 100 may again be transported as a non-hazmat portable power supply, block 1020.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall there between.

What is claimed is:

1. A portable power device having a first state of electrical isolation between cells and a second state of electrical interconnection between cells for configuration as a battery, comprising:

a cell block providing a plurality of electrically isolated encased lithium based electrochemical cells, each cell having one positive and one negative terminal a first conductor attached to each positive terminal and paired with a second conductor attached to each negative terminal, the paired first conductors and the second conductors grouped in at least one common location without interconnection between the first conductors and the second conductors, the cell block being a non hazardous shippable device; and a physically separate interconnection cap structured and arranged to temporarily attach to the cell block, the interconnection cap having at least one external positive terminal and at least one external negative terminal electrically connected to a receiver section structured and arranged to receive and make physical electrical contact with each of the paired conductors of the cell block to provide a battery by interconnecting the conductors from each cell at such time as the physically separate interconnection cap is disposed upon the cell block such that the receiver section is aligned to mate with each of the paired first conductors and the second conductors grouped in the at least one common location of the cell block;

wherein prior to coupling the physically separate interconnection cap to the grouped conductors of the cell block the portable power device is an inoperable collection of electrically isolated cells each having less than 20 watt hours, and upon coupling of the physically separate interconnection cap to the grouped conductors of the cell block, the portable power device is operable as a rechargeable battery having an energy capacity of at least 100 watt hours.

2. The portable power device of claim 1, wherein each lithium based electrochemical cell is rechargeable.

3. The portable power device of claim 1, wherein at least one cell block is disposed within a housing structured and arranged to couple with the physically separate interconnection cap and align the receiver section of the interconnection cap to the common location of each cell block providing the grouped positive and negative terminals.

4. The portable power device of claim 1, wherein the physically separate interconnection cap includes at least one electrical system to interconnect the conductors from each cell in combinations of parallel and series when coupled to the group conductors of the cell block.

5. The portable power device of claim 4, wherein the combinations of parallel and series are user adjustable.

6. The portable power device of claim 1, wherein the plurality of conductors are provided by at least one backplane circuit board disposed adjacent to the cell block.

7. The portable power device of claim 1, wherein the negative terminals of each cell are disposed towards a first side of the cell block and the positive terminals of each cell are disposed towards a second side of the cell block.

8. The portable power device of claim 1, wherein the positive and negative terminals of each cell are provided from a common end of the cell.

9. The portable power device of claim 8, wherein a first set of the cells are oriented to provide their positive and negative terminals to a first side of the cell block and a second set of the cells are oriented to provide their positive and negative terminals to a second side of the cell block.

10. The portable power device of claim 1, wherein the receiver section of the physically separate interconnection cap is structured and arranged to receive grouped conductors from a plurality of cell blocks.

11. The portable power device of claim 1, wherein the isolated lithium based electrochemical cells have a combined weight of less than 5 Kg.

12. A portable power device having a first state of electrical isolation between cells and a second state of electrical interconnection between cells for configuration as a battery, comprising:
 at least one cell block providing a plurality of electrically isolated encased lithium based electrochemical cells each in a predetermined location, each cell having one positive and one negative terminal in a predetermined location;
 at least one backplane circuit board disposed adjacent to each cell block and, for each positive and negative terminal of each cell, the adjacent circuit board providing electrically isolated traces from each cell to at least one grouping area, the grouping area providing a connection point for each trace; and
 a physically separate interconnection cap having at least one external positive terminal and external negative terminal connected by electrical circuitry to at least one connector structured and arranged to physically connect with each connection point of each trace at such time as the interconnection cap is disposed adjacent to the at least one cell block such that the cap connector engages the trace connection points;
 wherein prior to coupling the physically separate interconnection cap to the grouped conductors of the cell block the portable power device is an inoperable collection of electrically isolated cells each having less than 20 watt hours, and upon coupling of the physically separate interconnection cap to the grouped conductors of the cell block, the portable power device is operable as a rechargeable battery having an energy capacity of at least 100 watt hours.

13. The portable power device of claim 12, wherein each lithium based electrochemical cell is rechargeable.

14. The portable power device of claim 12, wherein each cell block and associated at least one backplane circuit board provide a cell block assembly, the isolated lithium based electrochemical cells having a combined weight of less than 5 Kg.

15. The portable power device of claim 12, wherein each lithium based electrochemical cell provides its positive and negative terminals from a common end.

16. The portable power device of claim 12, wherein each lithium based electrochemical cell provides its positive and negative terminals from opposite ends.

17. The portable power device of claim 12, wherein the grouping area is provided by a female pin connector and the interconnector cap connector is provided by a corresponding male pin connector.

18. The portable power device of claim 12, wherein in the grouping area is provided by a male pin connector and the interconnector cap connector is provided by a corresponding female pin connector.

19. The portable power device of claim 12, wherein at least one cell block is disposed within a housing structured and arranged to couple with the physically separate interconnection cap and align the at least one connector of the interconnection cap to the grouping area of each cell block providing the connection point for each trace.

20. The portable power device of claim 12, wherein the backplane circuit board has a first area providing electrical traces to at least a subset of cells having terminals adjacent to a first side of the cell block and a second area providing electrical traces to at least a subset of cells having terminals adjacent to a second side of the cell block, the grouping area disposed between the first area and the second area.

21. The portable power device of claim 12, wherein the backplane circuit board comprises a first circuit board and a second circuit board extending in opposite directions from a grouping pin connector, each circuit board coupled to the grouping pin connector by flexible electrical ribbon cable, the backplane circuit board thereby structured and arranged to be disposed about each cell block such that the first circuit board is adjacent to a first side of the cell block and the second circuit board is adjacent to the second side of the cell block opposite from the first.

22. The portable power device of claim 12, wherein the separate interconnector cap connector is structured and arranged to press fit upon the grouped connection points for each trace.

23. The portable power device of claim 12, further including a housing providing a chamber structured and arranged to receive the at least one cell block, the housing further providing an attacher structured and arranged to attach the physically separate interconnection cap to housing and align the interconnector cap connector to electrically couple to the grouped connection points of each trace to provide a battery with a protective housing.

24. The portable power device of claim 23, wherein the attacher is at least one threaded bolt disposed to pass through the physically separate interconnection cap and bind with housing.

25. The portable power device of claim 12, wherein the electrical circuitry of the physically separate interconnection cap is structured and arranged to interconnect the traces from each cell in parallel when the connector is coupled to the grouped connection points for each trace.

26. The portable power device of claim 12, wherein the electrical circuitry of the physically separate interconnection cap is structured and arranged to interconnect the traces from each cell in series when the connector is coupled to the grouped connection points for each trace.

27. The portable power device of claim 12, wherein the electrical circuitry of the physically separate interconnection cap is structured and arranged to interconnect the traces from each cell in combinations of parallel and series when the connector is coupled to the grouped connection points for each trace.

28. The portable power device of claim 27, wherein the combinations are of parallel and series are user adjustable.

29. The portable power device of claim 12, wherein the negative terminals of each cell are disposed towards a first side of the cell block and the positive terminals of each cell are disposed towards a second side of the cell block.

30. The portable power device of claim 12, provided as a kit for assembly by a user.

31. A kit for a portable power device having a first state of electrical isolation between cells and a second state of electrical interconnection between cells for configuration as a battery, comprising:
  at least one cell block providing a plurality of electrically isolated encased lithium based electrochemical cells each in a predetermined location, each cell having one positive and one negative terminal in a predetermined location;
  at least one backplane circuit board to be disposed adjacent to each cell block and for each positive and negative terminal of each cell providing electrically isolated traces from each cell to at least one grouping area, the grouping area providing a connection point for each trace;
  a housing having a chamber structured and arranged to receive the cell block and disposed backplane circuit board;
  a non-conductive spacer structured and arranged to fit around the connection point of the backplane circuit board when the backplane circuit board and cell block are disposed within the housing;
  a physically separate interconnection cap having at least one external positive terminal and external negative terminal connected by electrical circuitry to at least one connector structured and arranged to electrically connect with each connection point of each trace at such time as the interconnection cap is disposed adjacent to the at least one cell block such that the cap connector engages the trace connection points; and
  an attacher structured and arranged to attach the physically separate interconnection cap to housing and align the interconnector cap connector to electrically couple to the grouped connection points of each trace to provide a battery with a protective housing;
  wherein prior to coupling the physically separate interconnection cap to the grouped conductors of the cell block the portable power device is an inoperable collection of electrically isolated cells each having less than 20 watt hours, and upon coupling of the physically separate interconnection cap to the grouped conductors of the cell block, the portable power device is operable as a rechargeable battery having an energy capacity of at least 100 watt hours.

32. The kit for a portable power device of claim 31, wherein each lithium based electrochemical cell is rechargeable.

33. The kit for a portable power device of claim 31, wherein each cell block and associated at least one backplane circuit board provide a cell block assembly, the isolated lithium based electrochemical cells having a combined weight of less than 5 Kg.

34. The kit for a portable power device of claim 31, wherein a first backplane circuit board is disposed adjacent to a first side of each cell block and a second backplane circuit board is disposed adjacent to a second side of each cell block opposite from the first side, and for each cell block the first and second circuit boards coupled by flexible electrical ribbon cable to an associated grouping area proximate to a side of the cell block.

35. The kit for a portable power device of claim 31, wherein the grouping area is provided by a female pin connector and the interconnector cap connector is provided by a corresponding male pin connector.

36. The kit for a portable power device of claim 31, wherein the grouping area is provided by a male pin connector and the interconnector cap connector is provided by a corresponding female pin connector.

37. The kit for a portable power device of claim 31, provided as a kit for assembly by a user.

* * * * *